(12) United States Patent
Hsueh et al.

(10) Patent No.: US 6,485,046 B1
(45) Date of Patent: Nov. 26, 2002

(54) ANTI-SWAY TRAILER HITCH

(76) Inventors: Paul Hsueh, 4790 Myrtle Dr., Concord, CA (US) 94521; Jong-Ping Hsu, 11507 Ridgerock La., Rockville, MD (US) 20852

( * ) Notice: Subject to any disclaimer, the term of this patent is extended or adjusted under 35 U.S.C. 154(b) by 0 days.

(21) Appl. No.: 09/978,116

(22) Filed: Oct. 15, 2001

(51) Int. Cl.[7] .................................................. B60D 1/34
(52) U.S. Cl. ...................... 280/455.1; 280/459; 280/511
(58) Field of Search ............................... 280/455.1, 457, 280/456.1, 459, 460.1, 462, 483, 488, 511, 432

(56) References Cited

U.S. PATENT DOCUMENTS

| | | | | |
|---|---|---|---|---|
| 2,549,814 A | * | 4/1951 | Hume | |
| 3,263,833 A | * | 8/1966 | Evans | |
| 3,454,285 A | * | 7/1969 | Van Peursen | |
| 3,697,099 A | * | 10/1972 | Potts et al. | 280/457 |
| 4,133,552 A | * | 1/1979 | Sheine | |
| 4,582,337 A | * | 4/1986 | Hsueh | 280/455.1 |
| 5,335,856 A | * | 8/1994 | Nathan | 280/446.1 |

* cited by examiner

Primary Examiner—Anne Marie Boehler
(74) Attorney, Agent, or Firm—Larry D. Johnson; Craig M. Stainbrook; Johnson & Stainbrook, LLP (57) ABSTRACT

A trailer hitch assembly for connecting a towing vehicle to a towed trailer having symmetrical anti-sway features. The assembly includes a hitch ball rigidly affixed to a hitch beam extending transversely from the rear of the towing vehicle. A pair of spring-biased telescopic compressible and extendable control rods are connected to each end of the hitch beam and at their other ends to a control beam. A hitch bar is connected to the hitch ball on the towing vehicle and pivotally connected to the forward end of a trailer coupler that intersects and is pivotally connected to the central portion of the control beam by a pivot member. The pivot member is integral with the control beam and includes a control arm having a roller engaged with a downwardly opening slotted rearward end of the hitch bar. The trailer coupler includes a trailer hitch ball to which a trailer coupler socket is connected, with the trailer coupler socket being rigidly affixed to the tongue or frame of the towed vehicle.

31 Claims, 6 Drawing Sheets

ANTI-SWAY TRAILER HITCH

CROSS-REFERENCES TO RELATED APPLICATIONS

Not applicable.

BACKGROUND OF THE INVENTION

1. Field of the Invention

The present invention relates generally to trailer hitches, and more particularly to an improved anti-sway trailer hitch.

2. Discussion of Related Art

The vast majority of passenger vehicles include rear substantial area of mass which projects rearward from the back wheels of the vehicle. Trailer hitches are constructed such that the forward tongue portion of a trailer towed behind such vehicles is coupled to the vehicle at a point slightly rearward of the rear bumper of the vehicle. Even a slight right and left lateral shifting of the forward end of the towing vehicle results in concomitant left and right lateral shifting of the forward end of the trailer. This feature of a passenger vehicle trailer towing can be very dangerous, particularly if the trailer is improperly loaded such that the gross load of the trailer has a center of gravity disposed forward of the wheels of the trailer. The problem is evn more pronounced when the towed trailer has a large side elevational area upon which crosswind gusts and slip stream blasts may act.

Accordingly, a need exists for a trailer hitch connection between a vehicle and a trailer that will eliminate the sway tendencies of the vehicle and trailer combination as a result of slight lateral shifting of the forward end of the towing vehicle. Various solutions to the problem of trailer sway have been proposed, and anti-sway trailer hitches that include at least some of the general structural and operational features of the instant invention are disclosed in U.S. Pat. Nos. 2,201,660, 2,913,256, 3,254,905, 3,785,680, 3,787,077 and 3,825,282.

The most closely related improvement in anti-sway trailer hitch assemblies was disclosed in U.S. Pat. No. 4,582,337, by the present inventor. The '337 patent teaches an anti-sway trailer hitch constructed in a manner whereby slight lateral deflections to the right and left by the front end of a towing vehicle will not be directly transmitted to the trailing vehicle in the form of left and right lateral swaying movements. The inventive anti-sway trailer hitch is relatively simple, including only three major components other than the usual forward-projecting trailer tongue assembly and may therefore be readily incorporated into the manufacture of new trailers and trailer hitches as well as retrofitted to existing trailers and trailer hitches. Specifically, the hitch construction includes an elongated hitch bar, first connecting means pivotally attaching one end of the bar to the rear towing portion of said vehicle, means pivotally anchoring an intermediate length portion of the bar to the forward portion of the trailing vehicle for angular displacement of the hitch bar about a first upstanding axis relative to the forward portion, a control member pivotally supported from the forward portion of the trailing vehicle for angular displacement about a second upstanding axis spaced rearward of the first axis, second connecting means pivotally and slidably connecting the other end of the bar to the control member at a point spaced forward of the second axis, control means connected between the rear portion and the control member, wherein the control means includes an elongated link, means pivotally connecting one end of the link to the rear portion for angular displacement about a third upstanding axis spaced to one lateral side of the first connecting means, and means pivotally connecting the other end of the link to the control member for angular displacement about a fourth upstanding axis spaced to the same lateral side of the second axis.

The inventive hitch assembly taught in the '337 patent provides an anti-sway trailer hitch which may be utilized to couple a trailer to a towing vehicle in a manner such that slight lateral left and right movements of the forward end of the towing vehicle will not be transferred into lateral left and right movements, respectively, of the forward end of the towing vehicle. It also provides a hitch that may be readily retrofitted to existing trailer hitches and trailers; that provides an adjustment feature enabling adjustment of the anti-sway action of the hitch in accordance with the gross load represented by the associated trailer; and that provides an anti-sway trailer hitch made in the conventional forms of manufacture, is of simple construction and is easy to use so as to provide a device that will be economically feasible, long lasting and relatively trouble free in operation.

SUMMARY OF THE INVENTION

The hitch assembly of the present invention connects a rear wheel drive-towing vehicle and a towed vehicle. The forward end of the trailer is provided with a tongue or frame structure that extends forward and includes a trailer socket coupler. The hitch assembly includes a hitch beam extending transversely at the rear of the towing vehicle and rigidly affixed to the frame. The hitch beam has pivots points at each of its ends. The center of the hitch beam includes a towing vehicle hitch ball to which is connected an intermediate bar having a forward end and a rearward end, and includes a hitch bar having a hitch ball socket at the forward end for pivotal connection with the hitch ball. A hitch bar extension is detachably connected to the hitch bar.

A pair of compressible and extendable control rods are connected to opposite ends of the hitch beam by a detachable connection. The control rods have a forward end and a rear end and preferably comprise a first spring-biased control rod and a second spring-biased control rod. Each control rod includes a tubular sleeve having a forward end with a rod adjustably and threadbly affixed, and the rod can be adjusted in relation to tubular sleeve to accommodate different lengths of hitch bar and extension. The rear end of the tubular sleeve receives a movable rod with a coiled compression spring engaging an end flange on the tubular sleeve.

The rear end of the control rods are connected by a universal detachable connections to a control beam having ends and a central portion. The control beam between rod connections is preferably longer than the hitch beam between connections at the forward ends of the control rods.

A trailer coupler is pivotally connected to the central portion of the control beam. The coupler extends forward and rearward of the control beam, and the rearward end of the coupler is provided with a trailer hitch ball engaged by the trailer socket coupler. The pivotal connection includes a laterally extending arm at the upper end thereof, the arm being rigid with the control beam and pivotal in relation to the trailer coupler. The forward end of the trailer coupler has a pivotal connection that extends through the forward end of the trailer coupler and rearward portion of the hitch bar extension.

The pivotal movement between the trailer coupler and hitch bar extension is controlled by a roller rotatably journalled on a pin extending upwardly from the forward end of the arm and through a rotatable sleeve interposed between the upper surface of the arm and the lower end of the roller. The forward end of the arm is received within a downwardly opening slot in the rearward end portion of the hitch bar extension. The roller is located intermediate the pivot axis defined by the pivot bolt and the pivot connection forming the pivotal connection between the control beam and the trailer coupler. Accordingly, the pivotal movement of the hitch bar extension, the trailer coupler, and the control beam is controlled by the arm and the roller engaged in the slot.

When the towing vehicle turns, one end of the hitch beam exerts a pulling force on its correspondingly connected control rod, which through a rearward connection pulls on the same side of the control beam. The other end of the hitch beam exerts a pushing force against the corresponding end of the control beam through its corresponding control rod by compressing its spring. The combined pulling force on one side and pushing force on the other side on the control beam causes the control beam and arm to pivot about the central pivotal connection. When the articulated vehicles are moving in a relatively straight line, a very small pivotal and lateral movement of the hitch beam will cause large pivotal movement of the tow bar extension and trailer coupler. When the components are angled sharply from a straight line condition, a large movement of the hitch beam, hitch-ball, and control beam will produce a relatively small pivot movement of the tow bar extension and trailer coupler, proportionately small compared to the vehicle turning angle.

DETAILED DESCRIPTION OF THE PREFERRED EMBODIMENT

Although only one preferred embodiment of the invention is explained in detail, it is to be understood that the invention is not limited to its scope to the details of the construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents, which operate in a similar manner to accomplish a similar purpose.

Figure 1:
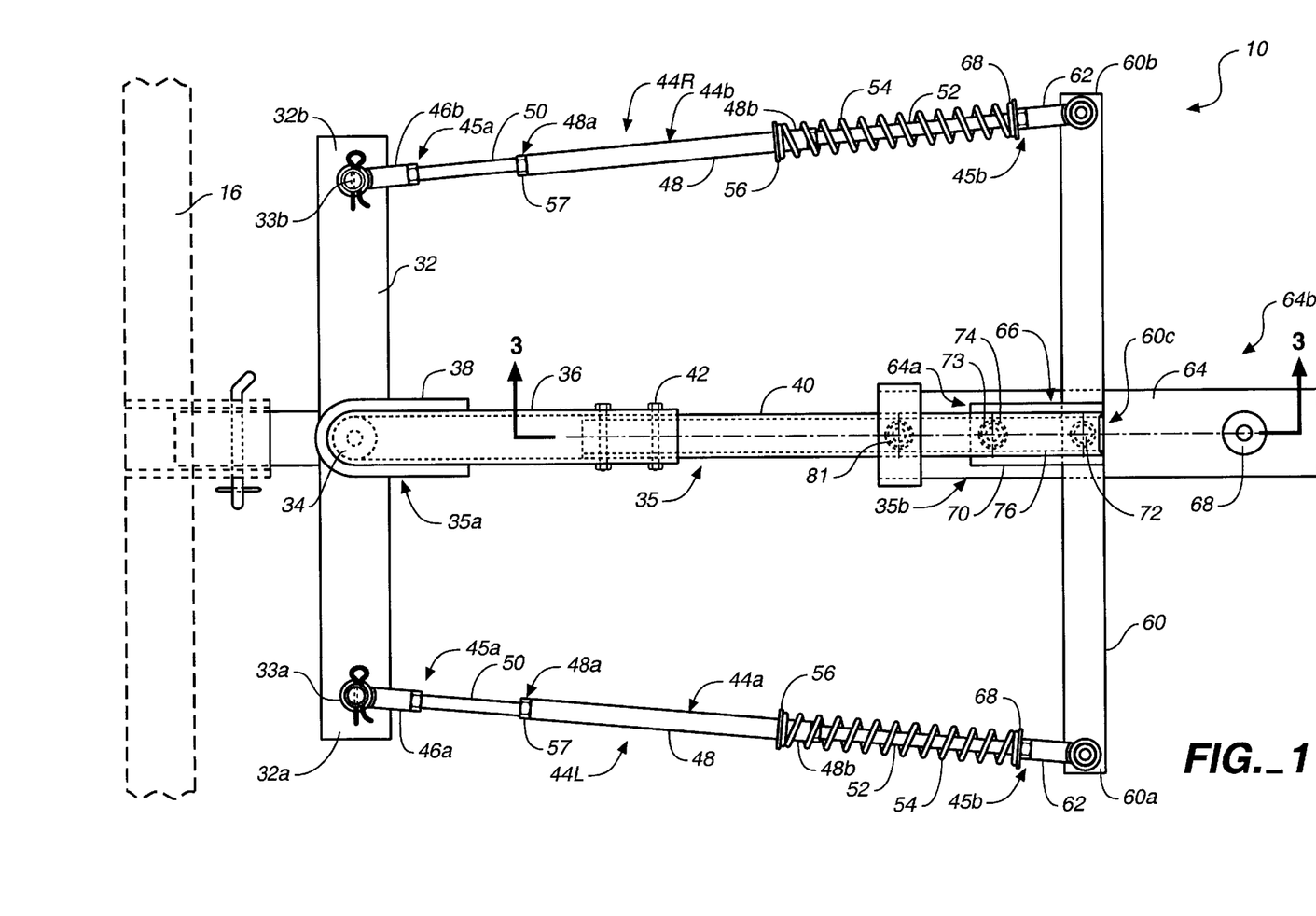
FIG. 1 is a top plan view of a preferred embodiment of the hitch assembly of the present invention illustrating the components in their straight-line position.
Figure 2:
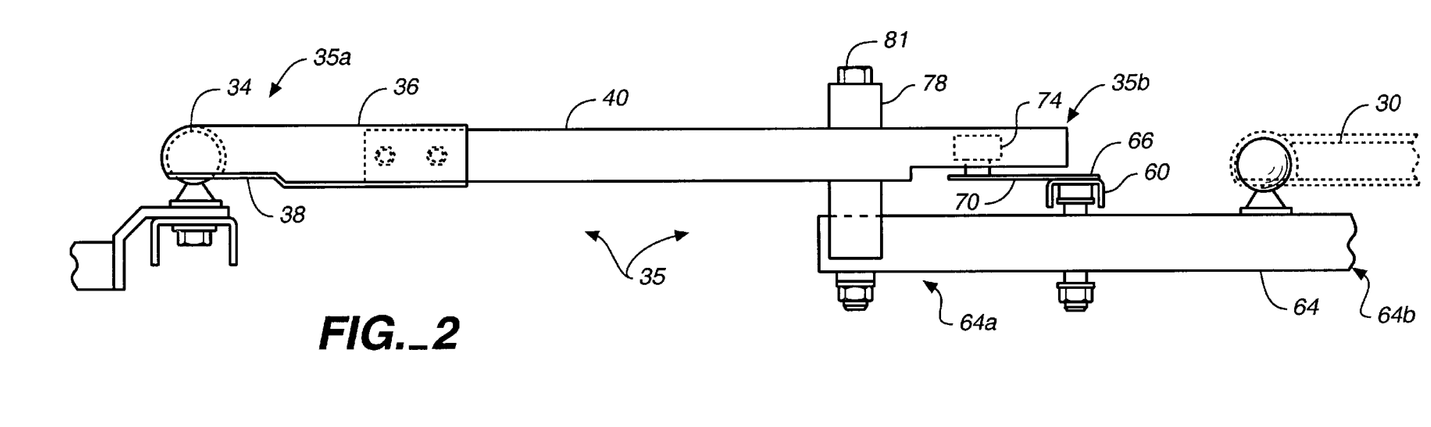
FIG. 2 is a side elevation view of the hitch assembly illustrated in FIG. 1.

The hitch assembly of the present invention is generally designated by reference numeral 10 and, as illustrated in FIG. 1, the hitch assembly 10 articulately connects a rear wheel drive-towing vehicle 12 and a towed vehicle 14. The towing vehicle 12 includes a frame 16, rear wheels 18 and a differential 20 incorporated into the rear drive axle 22 of the towing vehicle 12. The towed vehicle 14 is in the form of a trailer having supporting wheels 24 at opposite ends of an axle 26. Various supporting wheel and axle arrangements may be provided for the trailer 14, and the forward end of the trailer is provided with a tongue or frame structure 28 that extends forward and includes a trailer socket coupler 30 at forward thereof.

The hitch assembly includes a hitch beam 32 extending laterally (i.e., transversely) at the rear of the towing vehicle 12 and rigidly affixed to the frame 16 in a conventional and well-known manner. The hitch beam has a left end 32a and a right end 32b and a first pivot point 33a integrally connected to the left end and a second pivot point 33b integrally connected to the right end. The center of the hitch beam includes a towing vehicle hitch ball 34 to which is connected a an intermediate bar 35 having a forward end 35a and a rearward end 35b. Preferably the intermediate bar comprises a hitch bar 36 having a hitch ball socket 38 at the forward end thereof for universal pivot connection with the hitch ball 34 in a well known manner. A hitch bar extension 40 is detachably connected to the hitch bar 36 by fasteners 42. The hitch bar 36 and the extension 40 may be of unitary construction but the detachable connection 42 enables replacement of parts and possibly adjustment of the components.

Figure 6:
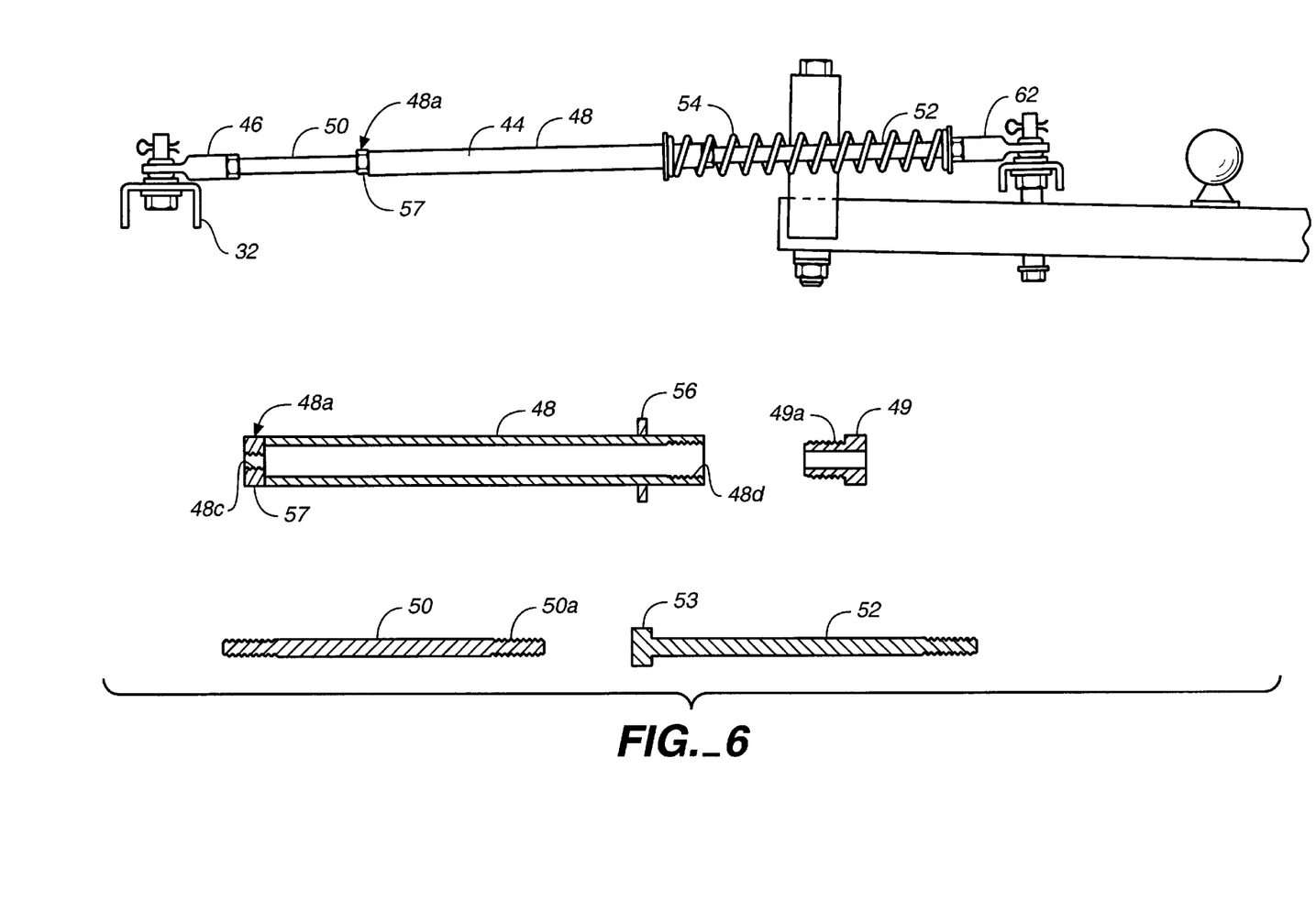
FIG. 6 shows the construction of the connecting rod assembly.
Figure 7:
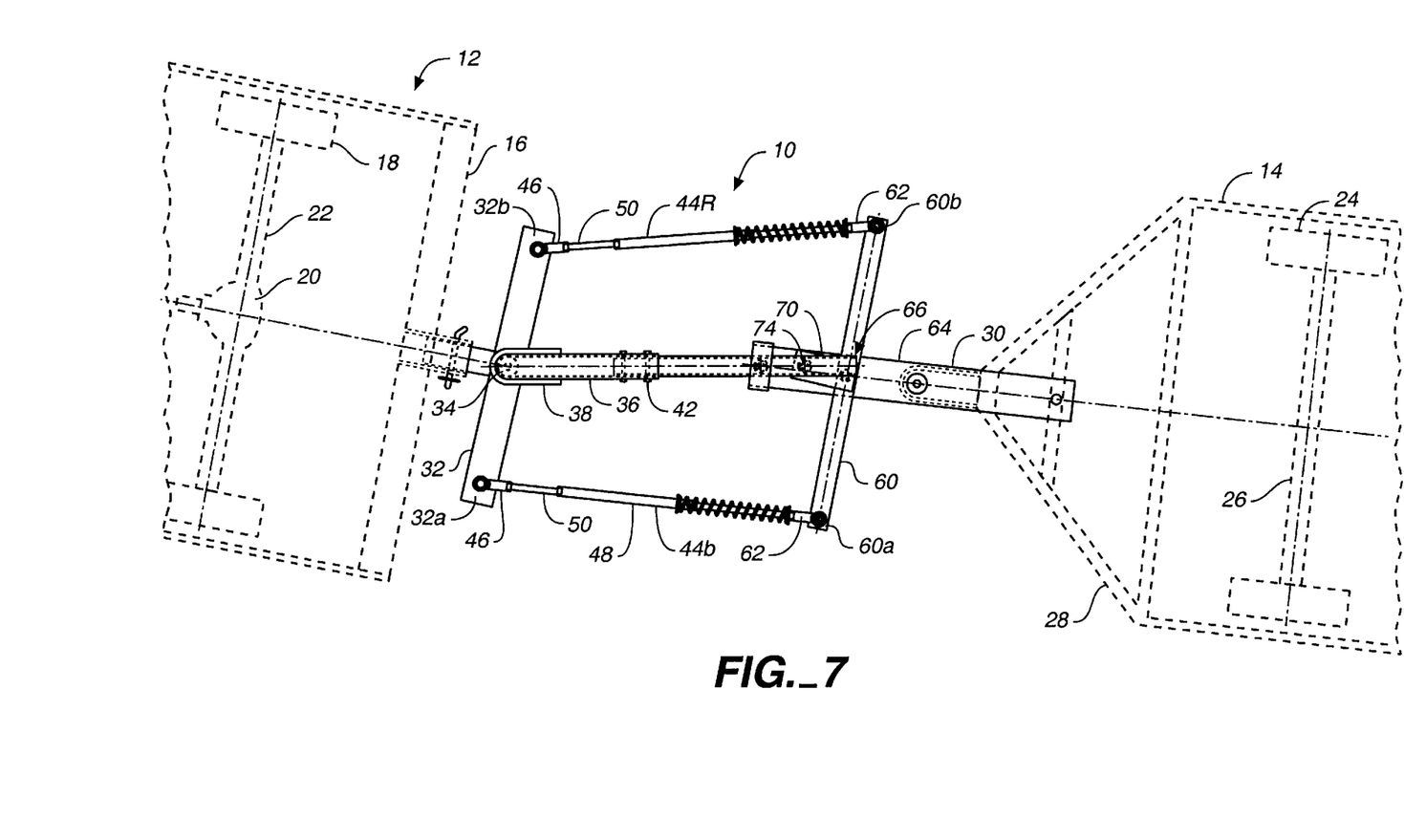
FIG. 7 is a top plan view of the hitch assembly of FIG. 1, illustrating the relationship of the components when the towing vehicle is making a slight turn to the right.

As illustrated in FIGS. 1, 6, and 7, a pair of compressible and extendable control rods, generally designated by reference numeral 44, are connected to opposite ends of the hitch beam 32 by universal, detachable connection 46. The control rods have a forward end 45a and a rear end 45b. In a preferred embodiment, the control rods comprise a first spring-biased control rod 44a and a second spring-biased control rod 44b. The connection 46 enables the control rods 44 to swing universally and be connected to and detached from the hitch beam 32. Each control rod 44 includes a tubular sleeve 48 having a forward end 48a with a rod 50 rigidly affixed thereto. The rod 50 is threaded with male threads 50a and the front end 48a of the tubular sleeve 48 is threaded with female threads 48c. The rod 50 can be adjusted in relation to tubular sleeve 48 to accommodate different lengths of hitch bar 36 and extension 40 when it is first set up. When adjustment is complete, each rod 50 can be locked to its corresponding tubular sleeve 48 by a nut 57, and should be done in a situation when the towing vehicle and towed vehicle are in a straight line. The rear end 48b of the tubular sleeve 48 receives a movable rod 52 with a coiled compression spring 54 engaging an end flange 56 on the tubular sleeve 48. The other end of the spring 54 engages a flange 58 that is rigid with the rod 52, so that the forward end of rod 52 can move longitudinally into and out of the tubular sleeve 48 against the compression force of the spring 54. The ends of rods 52 engaged inside tubular sleeves 48 includes a knob-shaped expansion 53. The rear ends 48b of the tubular sleeves 48 include female threads 48d, and a donut shaped collar 49 having external threads 49a threadably inserted into the tubular sleeves 48 when assembled. In this fashion, when rod 52 is installed, the knob-shaped expansion 53 will act against said collar 49 and cannot be drawn out completely, and the tension force of spring 54 will urge rod 52 outward from tubular sleeve 48, thereby biasing knob 53 against collar 49. The rod and spring lengths are made so that, when assembled, spring 52 is partially compressed. Due to this structure, rod 52 is normally at full extension, but can be pushed inward, when the outside compression force exerted against ends 46 & 62 is larger than the tension forces spring 54.

It will be readily appreciated by those with knowledge in the art that besides employing spring-type shock absorption means, control rods 44 could employ several other suitable means of compression and extension, including, but not limited to, viscous damping (dashpot) type shocks, flat viscosity hydraulic fluid shocks, and compressed gas shocks.

Referring now to FIG. 1, connected to the rearward end of the control rods 44 by universal detachable connections 62 is a control beam 60 having a left end 60a and a right end 60b, a central portion 60c, and integral pivot points 61a and 61b at the respective left and right ends for connection of detachable connections 62. The control beam 60 between connections 62 is preferably longer than the hitch beam 32 between connections 46 at the forward ends of the control rods 44. When the components of the hitch assembly and the articulately connected vehicles 12 and 14 are in a straight line condition, the control beam 60 is generally oriented in parallel relation to the hitch beam 32. In this straight line condition, the first and second control rods 44a, 44b are adjusted to be the same lengths by adjusting rod 50 in or out from tubular sleeve 48. When properly adjusted, the control rods 44 can be easily installed or removed from hitch beam 32 and control beam 60 without tension.

Referring again to FIG. 1, a trailer coupler 64 having a forward end 64a and a rearward end 64b is pivotally connected to the central portion of the control beam 60 by a pivotal connection 66. The coupler 64 extends forward and rearward of the control beam 60, and the rearward end of the coupler 64 is provided with a trailer hitch ball 68 that is engaged by the trailer socket coupler 30. This structure provided that the hitch assembly 10 can be easily adapted to trailers that are equipped with a socket coupler 30. The pivotal connection 66 includes a laterally extending arm 70 at the upper end thereof. The arm 70 is rigid with the control beam 60 and is pivotal in relation to the trailer coupler 64. The forward end of the trailer coupler 64 is provided with a pivotal connection in the form of a pivot bolt 72 that extends through the forward end of the trailer coupler 64 and rearward portion of the hitch bar extension 40.

Figure 3:
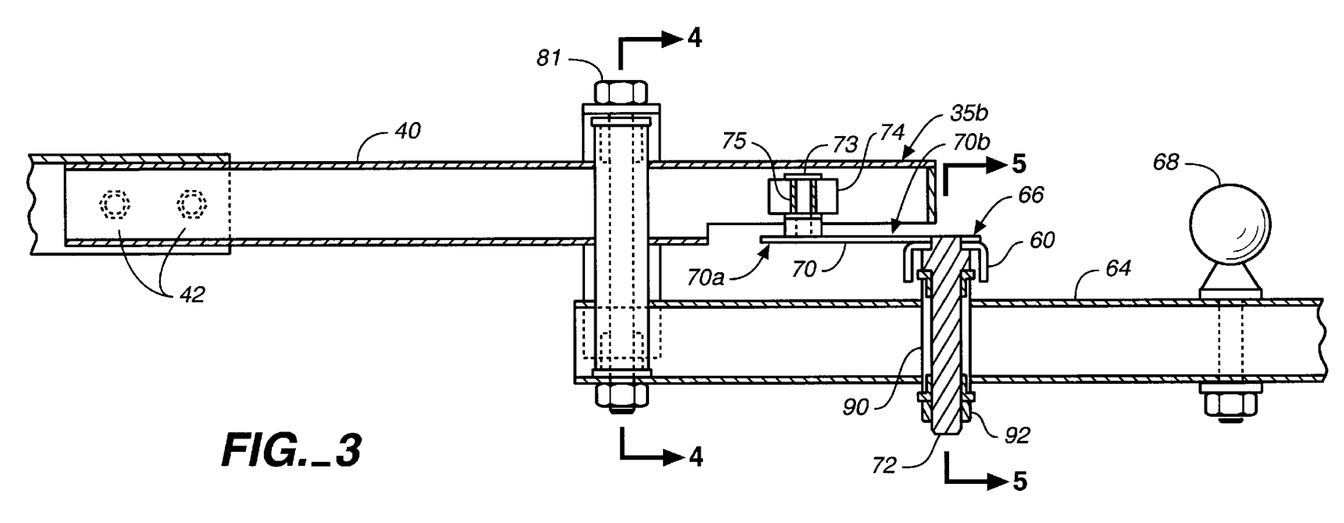
FIG. 3 is a longitudinal, vertical sectional view of the hitch assembly taken along section line 3—3 of FIG. 1.

The pivotal movement between the trailer coupler 64 and hitch bar extension 40 is controlled by a roller 74. The roller 74 is rotatably journalled on a pin 73 extending rigidly and upwardly from the forward end 70a of arm 70 and through a rotatable sleeve 75 interposed between the upper surface 70b of arm 70 and the lower end of roller 74. The forward end 70a of arm 70 is received within a downwardly opening slot 76 in the rearward end portion of the hitch bar extension 40. The roller 74 is located intermediate the pivot axis defined by the pivot bolt 72 and the pivot connection 66 forming the pivotal connection between the control beam 60 and the trailer coupler 64. Thus, the pivotal movement of the hitch bar extension 40, the trailer coupler 64 and the control beam 60 is controlled by the arm 70 and roller 74 engaged in the slot 76. As shown in FIG. 3, the rearward end of the tow bar extension 40 is closed by an end plate 41 which reinforces the side walls of the tow bar extension 40 at the rearward end of the downwardly opening slot 76.

Figure 4:
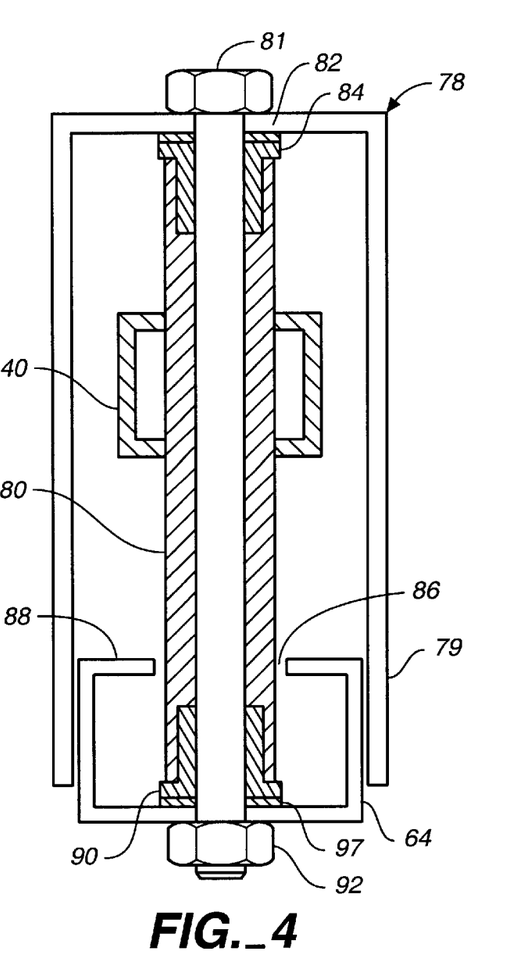
FIG. 4 is an end elevation view showing details of the forward pivotal connection of the hitch bar extension, as taken along Section line 4—4 of FIG. 3.

Referring to FIGS. 3 & 4, the upper end of the pivot bolt 81 extends through an inverted U-shaped bracket 78 which has legs 79 rigidly attached to the side walls of trailer coupler 64 at the forward end thereof. A sleeve 80 closely surrounds bolt 81 and extends through and is welded to the hitch bar extension 40 and closely underlies the top wall 82 of bracket 78. Two bearings in the form of flange bushings 84 are tightly fit into sleeve 80 at the top and bottom. The top bearing 84 is positioned against the top wall 82 of bracket 78. The lower end of sleeve 80 extends below the hitch bar extension 40, through a notch 86 in the top wall 88 of trailer coupler 64 and rotatably engages a reinforcing wear plate 90 rigidly mounted on the upper surface of bottom wall 97 of trailer coupler 64. A retaining nut and washer 92 are mounted on the lower threaded end of pivot bolt 81.

The pivot bolt 72 and sleeve 80 maintain the hitch bar extension 40 generally horizontally parallel to the trailer coupler 64 in order to maintain the roller 74 in the slot 76 and maintain the arm 70 parallel to the top wall 88 of trailer coupler 64 and the hitch bar extension 40.

Figure 5:
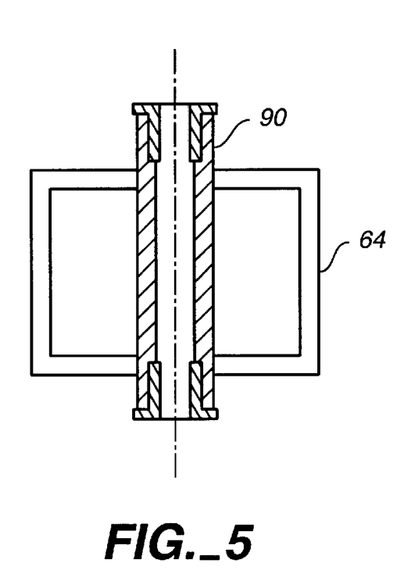
FIG. 5 is an end elevation view showing details of the rear pivotal connection of the hitch bar extension as taken along Section line 5—5 of FIG. 3.

Referring to FIGS. 3 & 5, the pivotal connection 66 includes an arm 70 and is rigidly secured to beam 60 and to pivot bolt 72. The pivot pin 72 extends downward through a sleeve 90, which extends through the top and bottom wall of coupler 64 and is rigidly welded to coupler 64. A nut 92 is fastened at the lower end of pivot bolt 72.

Figure 8:
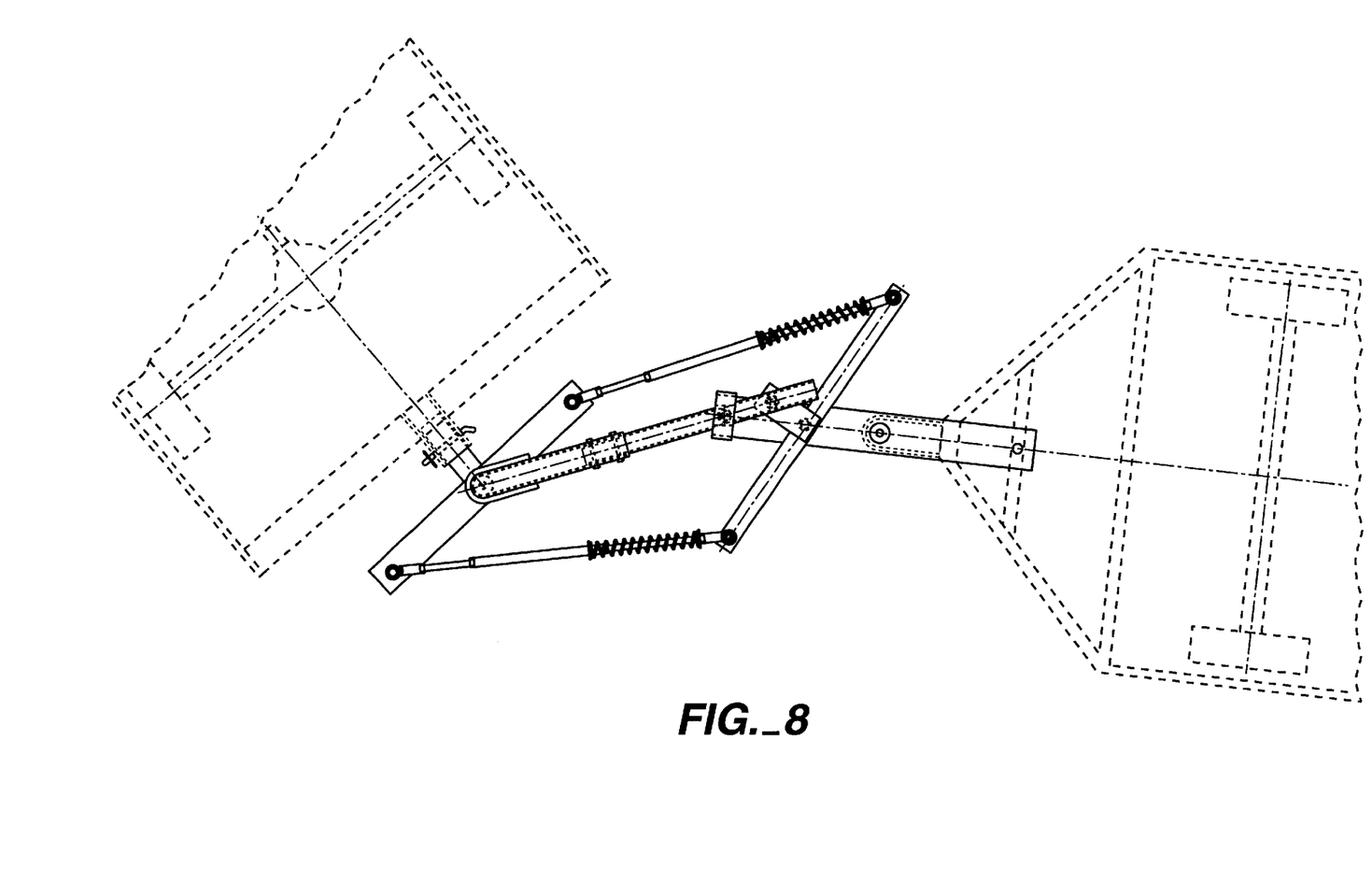
FIG. 8 is a top plan view of the hitch assembly of FIG. 1, illustrating the relationship of the operative components when the towing vehicle is making a sharp turn to the right.

Referring to FIGS. 7 & 8, as arm 70 and roller 74 pivot about pivotal connection 66, the roller 74 moves in an arc about the axis of pivotal connection 66 and the rearward end of the tow bar extension 40 swings about the axis formed by bolt 81. Thus, the distance between the roller 74 and the axis of pivot bolt 81 is at a minimum to cause maximum articulate movement of the tow bar extension 40 with minimum articulate movement of the roller 74. However, as soon as articulate movement of roller 74 and the rearward end of tow bar extension commences, the distance between roller 74 and pivot bolt 72 increases. This increase results in minimum movement of the tow bar extension 40 during maximum articulate movement of roller 74 as the included angle between arm 70 and tow bar extension 40 decreases.

When the towing vehicle turns, as illustrated in FIGS. 7 & 8, turning right, the left end of hitch beam 32 through connection 46, exerts a pulling force on control rod 44L, which through connection 62 pulls on the left end 60a of control beam 60. Since control rod 44L is at its maximum extension, hitch beam 32 is pulling on control beam 60 rigidly. Meanwhile, the right end 32b of hitch beam 32 exerts a pushing force against the right end 60b of control beam 60 through control rod 44R by compressing its spring. The combined pulling force on the left side and pushing force on the right end exerted on the control beam 60, will cause control beam 60 and arm 70 to pivot about pivotal connection 66.

Thus, when the articulated vehicles are moving in a relatively straight line, a very small pivotal and lateral movement of the hitch beam 32, which correspondingly causes a small pivotal movement of control beam 60, will cause large pivotal movement of the tow bar extension 40 and trailer coupler 64. As illustrated in FIG. 7, it can be seen, that the extended centerline of trailer 14 passes through center of towing vehicle 12 rear axle center 20. Although the towing vehicle 12 has made a slight right turn, the center line of towed trailer 14, which is the trailer 14 moving direction, has not been changed. This phenomena stabilizes the trailer 14, especially when the towing vehicle 12 is moving in relatively straight line at a high speed while making slight directional changes, such as during freeway travel. This provides the vehicle operator with significantly greater control.

However, when the components are in a sharply turned orientation away from a straight line condition, as illustrated in FIG. 8, a large movement of the hitch beam 32, hitch-ball 34 and control beam will produce a relative small pivot movement of the tow bar extension 40 and trailer coupler 64 that is not proportional to the vehicle turning angle. This arrangement is to permit the towing vehicle in a sharp turn not to overcompensate by leading the towed vehicle turning too far.

By using left and right control rods 44L, 44R simultaneously, the hitch assembly 10 will function symmetrically regardless of whether the towing vehicle 12 is turning left or right, and the towed trailer 14 will follow to the left or right equally. Devices in the prior art employ only one control rod on one side, rendering hitch assembly movement asymmetrical in left and right turns. The symmetrically applied control rods 44 improve stability and safety of the towing vehicle and towed trailer.

In another aspect, the inventive trailer hitch assembly can be described as an assembly for articulately connecting a towing vehicle to a towed vehicle, comprising: a hitch beam for attachment to the towing vehicle, the hitch beam having a hitch ball; a control beam having a left end with a left integral pivot point, a right end with a right integral pivot point, and a central portion; an intermediate bar having a forward end and a rearward end and a hitch ball socket at the forward end for connection to the hitch ball for universal pivot connection with the hitch ball; a pair of compressible and extendable control rods with the intermediate bar interposed between them, each of the control rods having a forward end pivotally connected to the hitch beam, and a rear end pivotally connected to the control beam; a trailer coupler having a forward end and a rearward end, said trailer coupler pivotally connected to the intermediate bar and to the central portion of the control beam by a pivotal connecting beam, wherein trailer coupler extends forward and rearward of said control beam, and wherein the rearward end of the trailer coupler is provided with a trailer hitch ball engaged by a trailer socket coupler. In this aspect, when the towing vehicle turns, the control rods compress and extend oppositely but symmetrically, and the control beam, intermediate bar, and pivotal connecting beam cooperatively pivot to moderate and decrease the effect of the turning motion of the towing vehicle on the towed vehicle.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as invention is:

1. An anti-sway trailer hitch assembly (10) for articulately connecting a towing vehicle (12) to a towed vehicle (14), comprising:

a hitch beam (32) for attachment to the towing vehicle, said hitch beam having a hitch ball (34), a left end (32a) having a first integral pivot point (33a), and a right end (32b) having a second integral pivot point (33b);

a control beam (60) having a left end (60a) with a left integral pivot point (61a), a right end (60b) with a right integral pivot point (61b), and a central portion (60c), an intermediate bar (35) having a forward end (35a) and a rearward end (35b) and a hitch ball socket (38) at said forward end for connection to said hitch ball (34) for universal pivot connection with said hitch ball;

a pair of compressible and extendable control rods (44) having a forward end (45a) and a rear end (45b), one of said control rods connected at its forward end to one end of said hitch beam by a universal, detachable connection (46), the other of said control rods connected at its forward end to the opposite end of said hitch beam by a universal, detachable connection (46), each of said control rods (44) having a rear end (45b) pivotally connected to said control beam (60) by universal detachable connection (62);

a trailer coupler (64) having a forward end (64a) and a rearward end (64b), said trailer coupler pivotally connected to said intermediate bar (35) and to said central portion (60c) of said control beam (60) by a pivotal connecting beam (66), wherein said trailer coupler extends forward and rearward of said control beam, and wherein said rearward end of said trailer coupler is provided with a trailer hitch ball (68) engaged by a trailer socket coupler (30).

2. The hitch assembly of claim 1, wherein said intermediate bar (35) comprises:

a hitch bar (36); and a hitch bar extension (40) detachably connected to said hitch bar (36) by at least one fastener (42).

3. The hitch assembly of claim 1, wherein said compressible and extensible control rods (44) include a left control rod (44L) and a right control rod (44R), and wherein said left control rod comprises a first telescopic spring-biased control rod (44a) pivotally connected to said first integral pivot point (33a) by a first universal, detachable connection (46a), and wherein said right control rod (44R) comprises a second telescopic spring-biased control rod (44b) pivotally connected to said second integral pivot point (33b) by a second universal, detachable connection (46b) said detachable connections (46a, 46b) enabling said control rods to swing universally and be connected to and detached from said hitch beam (32).

4. The hitch assembly of claim 3, wherein each of said control rods includes a tubular sleeve (48) having a forward end (48a) and a rod (50) rigidly affixed thereto, a rear end (48b) having an end flange (56), said rear end (45b) receiving a movable rod (52) having an integral end flange (58), and a coiled compression spring (54) interposed between said end flange (56) and said integral end flange (58), such that said movable rod (52) moves longitudinally into and out of said tubular sleeve (48) against the compression force of said spring (54).

5. The hitch assembly of claim 4, wherein said rod (50) is threaded with male threads (50a) at each of its ends and said front end (48a) of said tubular sleeve (48) is threaded with female threads (48c), and wherein said rod (50) can be adjusted in relation to said tubular sleeve (48) to accommodate different lengths of hitch bar (36) and said extension (40).

6. The hitch assembly of claim 4, wherein each of said rods (50) is locked to its respective tubular sleeve (48) by a nut (57).

7. The hitch assembly of claim 4, wherein the ends of rods (52) engaged inside tubular sleeves (48) includes a knob-shaped expansion (53), and wherein said rear end (48b) of said tubular sleeve (48) includes female threads (48d), and wherein a donut shaped collar (49) having external threads (49a) is threadably inserted into the said tubular sleeve (48) when assembled, characterized in that when rod (52) is installed said knob-shaped expansion (53) will act against said collar (49) and cannot be drawn out completely, and the tension force of spring (54) will urge rod (52) outward from tubular sleeve (48), thereby engaging knob (53) against collar (49).

8. The hitch assembly of claim 1 wherein said pivotal connecting beam (66) includes a laterally extending arm (70) at the upper end thereof, said arm rigidly affixed to said control beam (60) and pivotal in relation to said trailer coupler (64), wherein said forward end (64a) of said trailer coupler (64) is pivotally connected by a pivot bolt (72) to said trailer coupler (64) and extends through the forward end (64a) of said trailer coupler (64) and said rear end (35b) of said intermediate bar (35).

9. The hitch assembly of claim 1, wherein the pivotal movement between the trailer coupler (64) and hitch bar extension (40) is controlled by a roller (74), said roller rotatably journalled on a pin (73) extending rigidly and upwardly from the forward end (70a) of arm (70) and through a rotatable sleeve (75) interposed between the upper surface (70b) of arm (70) and the lower end of roller (74).

10. The hitch assembly of claim 9, wherein said forward end (70a) of arm (70) is received within a downwardly opening slot (76) in the rearward end portion of the hitch bar extension (40), and wherein said roller (74) is located intermediate the pivot axis defined by the pivot bolt 72 and the pivot connection (66) forming the pivotal connection between said control beam (60) and said trailer coupler (64), characterized in that the pivotal movement of the hitch bar extension (40), the trailer coupler (64), and the control beam (60) is controlled by said arm (70) and said roller (74).

11. The hitch assembly of claim 1, wherein the length of said control beam (60) between said connections (62) is longer than the length of said hitch beam (32) between connections (46).

12. The hitch assembly of claim 1, wherein when said hitch assembly (10) and the articulately connected vehicles (12) and (14) are in a straight line condition said control beam (60) is oriented in a substantially parallel relation to said hitch beam (32).

13. An anti-sway trailer hitch (10) for articulately connecting a towing vehicle (12) having a frame (16) and a towed vehicle (14), wherein the forward end of the towed vehicle (14) includes a tongue or frame structure (28) that extends forward and includes a trailer socket coupler (30), said anti-sway trailer hitch comprising:

a hitch beam (32) extending transversely at the rear of the towing vehicle and rigidly affixed to the frame (16), said hitch beam having a hitch ball (34), a left end (32a) having a first integral pivot point (33a), and a right end (32b) having a second integral pivot point (33b);

an intermediate bar (35) having a forward end (35a) and a rearward end (35b) and a hitch ball socket (38) at said forward end for connection to said hitch ball (34) for universal pivot connection with said hitch ball;

a first control rod (44a) having a forward end and a rear end, and a second control rod (44b) having a forward end and a rear end, one each connected to said left and rights ends of said hitch beam by a universal, detachable connection (46), each of said control rods having a forward end (45a) and a rear end (45b);

a control beam (60) having a left end (60a) with a left integral pivot point (61a), a right end (60b) with a right integral pivot point (61b), and a central portion (60c), said control beam connected to said rear end (45b) of said control rods (44) by universal detachable connections (62);

a trailer coupler (64) having a forward end (64a) and a rearward end (64b), said trailer coupler pivotally connected to said intermediate bar (35) and to said central portion (60c) of said control beam (60) by a pivotal connecting beam (66), wherein said trailer coupler extends forward and rearward of said control beam, and wherein said rearward end of said trailer coupler is provided with a trailer hitch ball (68) engaged by said trailer socket coupler (30).

14. A hitch assembly for articulately connecting a towing vehicle to a towed vehicle, comprising:

a hitch beam for attachment to the towing vehicle, said hitch beam having a hitch ball;

a control beam having a left end with a left integral pivot point, a right end with a right integral pivot point, and a central portion;

an intermediate bar having a forward end and a rearward end and a hitch ball socket at said forward end for connection to said hitch ball for universal pivot connection with said hitch ball;

a pair of compressible and extendable control rods with said intermediate bar interposed between, each of said control rods having a forward end pivotally connected to said hitch beam, and a rear end pivotally connected to said control beam;

a trailer coupler having a forward end and a rearward end, said trailer coupler pivotally connected to said intermediate bar and to said central portion of said control beam by a pivotal connecting beam, wherein said trailer coupler extends forward and rearward of said control beam, and wherein said rearward end of said trailer coupler is provided with a trailer hitch ball engaged by a trailer socket coupler;

wherein when said towing vehicle turns, said pair of control rods compress and extend oppositely, and said control beam, said intermediate bar, and said pivotal connecting beam cooperatively pivot to moderate and decrease the effect of the turning motion of the towing vehicle on the towed vehicle.

15. A trailer hitch assembly for articulately connecting a towing vehicle and a towed vehicle, comprising:

a hitch beam extending laterally and rigidly at the rear of a towing vehicle and having a central portion and outer ends;

a hitch ball centrally located on said hitch beam;

a hitch bar having a forward end and a rearward end, and a hitch ball socket at said forward end thereof universally pivotally connected to said hitch ball on said hitch beam;

a pair of telescopic spring biased control rods universally to outer end portions of said hitch beam, said control rods having forward and rearward ends;

a control beam interconnecting said rearward ends of said control rods, said control beam having a central portion and outer ends; and a trailer coupler pivotally connected to a central portion of said hitch beam, said trailer coupler including a trailer hitch ball for universal pivotal connection with the towed vehicle, said trailer coupler having a forward end connected to said hitch bar by a pivotal connection at a forward end of said trailer coupler and by a longitudinally movable pivotal connection intermediate the pivotal connection with the hitch bar and the pivotal connection with the control beam, said control beam being oriented in parallel relation to the hitch beam when the vehicles are moving in a straight line path, said control beam in response to pivotal movement of the hitch beam to shift the articulate connection between the trailer coupler and hitch bar laterally in a direction inwardly of the radius of hitch balls when a towing vehicle is steered in a path.

16. The hitch assembly of claim 15, wherein said longitudinally pivotal connection between said hitch bar and said control beam includes a forwardly extending arm having a forward and a rearward end, and rigid with said control beam and pivotally engaged with said trailer coupler, said arm including a roller at said forward end thereof and positioned in a slot oriented at said rearward end of said hitch bar with said roller and slot in said hitch bar being oriented between said pivotal connection between said hitch bar and said forward end of said trailer coupler and said pivotal connection between said control beam and said trailer coupler.

17. The hitch assembly of claim 16, wherein said hitch beam extends laterally from a longitudinal centerline of the towing vehicle and towed vehicle when the vehicles are moving in a straight path, said control rods transferring forces from said outer ends of said hitch beam to outer ends of said control beam to pivot said control beam and arm in the same direction as the hitch beam and pivoting the rearward end of the hitch bar in the same direction about the pivotal connection between the hitch bar and forward end of the trailer coupler as the forward end of the hitch bar pivots about the hitch ball on the hitch beam thereby swinging the forward end of the trailer coupler toward the direction of turning movement of the towing vehicle to move the towed vehicle in a path having a radius less than the path of the towing vehicle.

18. The hitch assembly of claim 17, wherein said pivotal connection between said hitch bar and said forward end of said trailer coupler includes an elongated pivot bolt extending through said hitch bar and said forward end of said trailer coupler, said pivot bolt being disposed forwardly of said roller and slot.

19. The hitch assembly of claim 18, wherein said arm is located above said trailer coupler and below said rearward end of said hitch bar, and further including a depending pivot member rigid with a rearward end of said arm and extending downwardly through and pivotally associated with said trailer coupler, said pivot member being rigidly connected to said control beam thereby pivotally interconnecting said control beam and said trailer coupler and transferring pivotal movement of said control beam to said arm to move said roller at said forward end of said arm in an arcuate path about a pivot axis defined by said pivot member and move said hitch bar and said trailer coupler in an arcuate path.

20. The hitch assembly of claim 15, wherein each of said control rods includes a tubular member telescopically receiving a rod member, and a compression coil spring biasing said rod member outwardly of said tubular sleeve.

21. The hitch of claim 15, wherein said control rods have ends detachably connected to said outer ends of said hitch beam and said control beam to bias said hitch beam and control beam toward parallel relation.

22. In combination, a towing vehicle, a towed vehicle and a hitch assembly articulately interconnecting the towing vehicle and the towed vehicle, said towing vehicle including a hitch ball fixedly mounted on a rearward end portion thereof, a hitch bar connected to said hitch ball for universal pivotal movement relative thereto and extending rearwardly therefrom, said towed vehicle including a rigid forwardly extending tongue having a hitch ball socket mounted thereon, said hitch assembly including a longitudinally extending coupler having a rearward end portion and a forward end portion, said rearward end portion of said coupler having a hitch ball fixedly mounted thereon and connected to said hitch socket on said tongue on the towed vehicle for universal pivotal movement relative thereto, said forward end portion of said coupler overlapping a rearward end portion of said hitch bar, a pivotal connection between said rearward end portion of said hitch bar and said forward end portion of said coupler for relative movement about a generally vertical axis and articulately interconnecting the towing vehicle and towed vehicle, and a linkage system interconnecting the towed vehicle and said rearward end portion of said hitch bar to control relative pivotal movement between said rearward end portion of said hitch bar and said forward end portion of said coupler about the vertical axis of said pivotal connection lateral directions during relative pivotal movement between the towing vehicle and towed vehicle.

23. The combination of claim 22, wherein said linkage system includes a pair of control rods connected to said towing vehicle at points laterally spaced from and on opposite sides of said hitch ball on the towing vehicle and said hitch bar connected to said hitch ball on the towing vehicle, a transversely extending control beam having end portions pivotally connected to rearward ends of said control rods, said control beam including a central portion pivotally connected to said coupler between said hitch ball on said coupler and said pivotal connection between said coupler and said hitch bar, a control arm rigidly connected to said control beam at said pivotal connection between said control beam and said coupler and extending forwardly therefrom toward said pivotal connection between said forward end portion of said coupler and said hitch bar, said control arm including a longitudinally movable pivotal connection with the rearward end portion of said hitch bar rearwardly of said pivotal connection between said hitch bar and said forward end portion of said coupler.

24. The combination of claim 23, wherein said longitudinally movable pivotal connection includes a longitudinal slot and pin connection.

25. The combination of claim 24, wherein said slot is in said hitch bar and said pin is on said control arm.

26. The combination of claim 24, wherein said hitch bar overlies said forward end portion of said coupler, said rearward end portion of said hitch bar being a tubular member having a downwardly opening portion defining said slot and a roller on said pin, said roller being positioned in said tubular member and rollingly engaging side walls thereof for guiding the relative longitudinally movable pivotal connection between said forward end portion of said coupler and said rearward end portion of said hitch bar.

27. The combination of claim 23, wherein said forward ends of said control rods are universally connected to said towing vehicle and rearward ends universally connected to said outer ends of said control beam to pivot said control beam in response to relative pivotal movement about a vertical axis between the towing vehicle and towed vehicle.

28. The combination of claim 27, wherein each of said control rods includes a pair of telescopic members which are spring biased toward extended position to exert equal spring biased force on said ends of said control beam when the towing and towed vehicles are moving in a straight line path and equally resisting forces transferred to the towing vehicle when said tongue on the towed vehicle sways laterally to enable an operator of the towing vehicle to maintain optimum control of said vehicles.

29. The combination of claim 27, wherein said longitudinally movable pivotal connection includes a longitudinal slot and pin connection, said slot being in said hitch bar and said pin being on said control arm.

30. The combination of claim 29, wherein said hitch bar overlies said forward end portion of said coupler, said rearward end portion of the hitch bar being a tubular member having a downwardly opening portion defining said slot and a roller on said pin, said roller being positioned in said tubular member and rollingly engaging side walls thereof for guiding the relative longitudinally movable pivotal connection between said forward end of the coupler and said rearward end portion of said hitch bar.

31. A hitch assembly for articulately connecting a towed vehicle to a towing vehicle which comprises a hitch beam rigidly connected to the towing vehicle, a hitch bar universally connected to said hitch beam, a pair of telescopic spring biased control rods universally connected at front ends to said hitch beam at either side of said hitch bar connection, a control beam universally interconnecting rearward ends of said control rods, and a trailer coupler pivotally connected to said control beam intermediate said rearward ends of said control rods and including a trailer hitch ball for universal pivotal connection with said towed vehicle.

* * * * *